US011573292B2

(12) United States Patent
Nguyen et al.

(10) Patent No.: US 11,573,292 B2
(45) Date of Patent: Feb. 7, 2023

(54) TRANSMITTING DEVICE FOR AN OPTICAL SENSING DEVICE OF A MOTOR VEHICLE WITH A SPECIFIC PRE-ASSEMBLY MODULE, OPTICAL SENSING DEVICE AND MOTOR VEHICLE (71) Applicant: Valeo Schalter und Sensoren GmbH, Bietigheim-Bissingen (DE)

(72) Inventors: Ho Hoai Duc Nguyen, Bietigheim-Bissingen (DE); Peter Horvath, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 718 days.

(21) Appl. No.: 16/495,916

(22) PCT Filed: Mar. 19, 2018

(86) PCT No.: PCT/EP2018/056820
§ 371 (c)(1),
(2) Date: Sep. 20, 2019

(87) PCT Pub. No.: WO2018/172246
PCT Pub. Date: Sep. 27, 2018

(65) Prior Publication Data
US 2020/0132815 A1 Apr. 30, 2020

(30) Foreign Application Priority Data
Mar. 21, 2017 (DE) .......................... 102017105997.0

(51) Int. Cl.
G01S 17/931 (2020.01)
G01S 7/481 (2006.01)
(52) U.S. Cl.
CPC .......... G01S 7/4814 (2013.01); G01S 17/931 (2020.01)

(58) Field of Classification Search
CPC ............................ G01S 7/4814; G01S 17/931
See application file for complete search history.

(56) References Cited

U.S. PATENT DOCUMENTS 9,651,210 B2 * 5/2017 Ziegler ................. F21S 41/285
2010/0245849 A1 * 9/2010 Satzky .................. G01S 7/4972
356/622

(Continued)

FOREIGN PATENT DOCUMENTS

CN 202421694 U 9/2012
DE 102014216958 A1 7/2015

(Continued)

OTHER PUBLICATIONS

International Search Report and Written Opinion in corresponding International Application No. PCT/EP2018/056820, dated Aug. 21, 2018 (19 pages).

(Continued)

Primary Examiner — Jennifer Doan
(74) Attorney, Agent, or Firm — Osha Bergman Watanabe & Burton LLP (57) ABSTRACT The invention relates to a transmitting device (6) for an optical sensing device (5) of a motor vehicle (1), with at least one light source unit (32), with an optical device (17) that influences the beam shape of the light emitted by the at least one light source unit (32), wherein the light is transmitted into the surroundings (4) of the motor vehicle (1) by means of the transmitting device (6), wherein the transmitting device (6) comprises a housing (15) in which the light source unit (32) and the optical device (17) are arranged and as a result a pre-assembly module (16) is formed for installation on a printed circuit board (36) of the transmitting device (6).

15 Claims, 4 Drawing Sheets (56) References Cited

U.S. PATENT DOCUMENTS

| | | |
|---|---|---|
| 2013/0229645 A1 | 9/2013 | Suzuki et al. |
| 2019/0154439 A1* | 5/2019 | Binder ................... G01B 11/26 |
| 2022/0169178 A1* | 6/2022 | Herrmann ................. B60R 1/06 |

FOREIGN PATENT DOCUMENTS

| | | |
|---|---|---|
| DE | 102015115101 A1 | 3/2017 |
| JP | 2902780 B2 | 6/1999 |
| JP | 2007-114141 A | 5/2007 |
| JP | 2007-214564 A | 8/2007 |
| JP | 2007-311524 A | 11/2007 |
| JP | 2009-146979 A | 7/2009 |
| JP | 2011-165760 A | 8/2011 |
| JP | 2014-514781 A | 6/2014 |
| KR | 10-2005-0105838 A | 11/2005 |
| WO | 2012/059864 A1 | 5/2012 |
| WO | 2012/154510 A2 | 11/2012 |

OTHER PUBLICATIONS

German Search Report in corresponding German Application No. 10 2017 105 997.0, dated Feb. 28, 2019 (6 pages).
Notice of Reason for Rejection in corresponding Japanese Application No. 2019-552169, dated Sep. 15, 2020 (12 pages).
Notice of Preliminary Rejection in corresponding Korean Application No. 2019-7027555, dated Dec. 8, 2020 (12 pages).

* cited by examiner

TRANSMITTING DEVICE FOR AN OPTICAL SENSING DEVICE OF A MOTOR VEHICLE WITH A SPECIFIC PRE-ASSEMBLY MODULE, OPTICAL SENSING DEVICE AND MOTOR VEHICLE

TECHNICAL FIELD

The present invention relates to a transmitting device for an optical sensing device of a motor vehicle with at least one light source unit. The transmitting device also comprises an optical device, which influences the beam shape of light emitted by at least one light source unit. By means of the transmitting device, the light can be sent into the surroundings of the motor vehicle. Furthermore, the invention relates to an optical sensing device with a transmitting device and a motor vehicle with an optical sensing device.

BACKGROUND OF THE INVENTION

Transmitting devices from the prior art are relatively large, since in particular a housing for an optical device is relatively large. Furthermore, the transmitting devices often comprise a thermally conductive copper plate, on which components of the transmitting device are then arranged. Furthermore, individual components of the transmitting device are often joined together, in particular screwed together, so that the transmitting device itself is very large due to the numerous fasteners. Thus, the assembly of the large transmitting device for the optical sensing device is associated with a high time cost. Furthermore, due to the size, the weight and due to the large number of individual components the transmitting devices from the prior art are not suitable for automated assembly.

PATENT LITERATURE

WO 2012/059864 A1 discloses an optical element that is formed from a substrate, which is designed to be transparent at least in a wavelength range of the optical radiation. The optical element comprises a first interface that comprises round regions and that is part of a lens arrangement that is formed in the substrate. The substrate also comprises a plurality of optical mirror elements, which are disposed on a second interface of the substrate. The optical mirror elements are arranged in such a way that they reflect optical radiation.

SUMMARY OF INVENTION

Technical Problem

The transmitting device shown here comprises a smaller number of components, but this is not suitable for automated assembly.

Solution to Problem

The object of the present invention is to create a transmitting device, an optical sensing device and a motor vehicle embodied with fewer components. The transmitting device is also intended to be able to be mounted more quickly in a manufacturing process.

This object is achieved by a transmitting device, an optical sensing device and a motor vehicle according to the independent claims.

One aspect of the invention relates to a transmitting device for an optical sensing device of a motor vehicle. The transmitting device comprises at least one light source unit. Furthermore, the transmitting device comprises an optical device, which influences a beam shape of light emitted by the at least one light source unit. The light can be transmitted to the surroundings of the motor vehicle by means of the transmitting device.

The transmitting device comprises a housing in which the light source unit and the optical device are arranged. As a result, a pre-assembly module is formed for mounting on a printed circuit board of the transmitting device. This creates a compact transmitting device and with a reduced component count.

By arranging the light source unit and the optical device in the housing, a compact component assembly can be created, which as such can then be further mounted easily and also automatically. Furthermore, in particular screws or other fastening means can thus be eliminated, thus saving both weight and further installation space. Due to the arrangement of the light source unit and the optical device in the housing, a module is thus created that can be pre-mounted, so that this pre-assembly module can be disposed on the circuit board of the transmitting device very easily and especially in a time-saving manner during the manufacturing process of the transmitting device. Furthermore, the housing is designed in such a way that, in contrast to the prior art, due to the saving of installation space it can be disposed directly on the circuit board and thus connecting wires to the contacts of the circuit board can be omitted.

According to an advantageous embodiment, the pre-assembly module, in particular with regard to the manufacturing technology for further processing of the pre-assembly module, can be embodied as a surface mount module, which can also be referred to as an SMT module. Thus, the transmitting device can be soldered directly to the printed circuit board by means of the associated surface mount technology (Surface mount technology, SMT). In this technology, especially in an automated process, the surface mounted module can be arranged on the printed circuit board. Thus, embodying the pre-assembly module as a surface mounted module can save time in the automated process. Furthermore, a significant reduction can be achieved in the size of the circuit or the transmitting device due to the smaller component dimensions, the narrow conducting track intervals on the printed circuit board and the thinner conducting tracks on the printed circuit board. Due to the elimination of connecting wires and the use of the smaller components, the transmitting device is reduced in weight. Furthermore, a higher manufacturing quality can be achieved by automatic production, as sources of contamination (cutting and bending of the connecting wires) are prevented. It is known from surface mounting that automated optical inspections of all critical optically verifiable factors are possible, which also ensures an increase in quality.

According to an advantageous embodiment, the housing may comprise a plate-shaped housing base body and an, in particular block-shaped, housing attachment, wherein the housing can be attached to the printed circuit board by means of the housing base body and the optical device and the light source unit are disposed in the especially block-shaped housing attachment. By means of this embodiment, housings can thus be formed specifically for the printed circuit board, since in particular the block-shaped housing attachment contains the optical device and the light source unit. Thus, only the housing base body has to be adjusted according to the printed circuit board. Thus, the optical device and the light source unit can be provided for a variety of different circuit boards, in which only the housing base body needs to be adjusted in its dimensions to the printed circuit board.

Preferably, the optical device comprises an external resonator. By using the external resonator, the light intensity of the transmitting device can be increased in a simple manner.

It is also advantageous if the optical device comprises a lens arrangement. By means of the lens arrangement, the light of the light source unit can be bundled and thus the power of the transmitting unit or the emitted light can be increased.

In an advantageous embodiment, the housing attachment may be formed on the inside in a stepped manner and comprise at least a first and a second land. Platforms are thus formed at different levels on which other components can be arranged. In particular, the one-piece design of the lands on the housing attachment reduces the number of separate components and thus also saves assembly effort. In particular, this also allows permanently positionally precise arrangement of the other components in the housing attachment. Thus, a simple option is provided to be able to arrange corresponding components in the housing attachment in a simple way. In particular, these components may be a lens arrangement and/or an external resonator. In particular, this prevents fasteners that are intended to fasten the components in the housing attachment from being able to protrude, in particular into an optical path of the light source unit. In addition, further components can be saved and the weight of the transmitting device can be reduced. As a result, reliable operation of the transmitting device can be implemented in a particularly simple way.

It has also proved advantageous if the external resonator of the optical device is disposed on the lower first land, in particular the platform, and the lens arrangement of the optical device is disposed on the higher land, in particular the platform. By means of this embodiment, the emitted light of the light source unit can be adapted to the desired beam shape.

According to an advantageous embodiment, the housing base body may be of an angular form and is designed to protrude beyond the dimensions of the housing attachment in both spatial directions in the plane thereof spanning the plate shape. In particular, as a result a simple geometric shape can be provided, which allows easy mounting on the printed circuit board, especially in the case of automated assembly.

It has also proved advantageous if at least two electrical connection points are formed on the housing base body, one of which is a plus pole of the transmitting device and one is a minus pole of the transmitting device and/or the electrical connection points are formed on a first edge of the housing base body. Thus, suitable electrical connection points for the operation of the transmitting device can be provided on the housing base body, so that the transmitting device can be soldered onto the corresponding printed circuit board very easily. Due to the soldering, in particular small positioning errors when mounting the transmitting device on the printed circuit board can be corrected automatically due to the surface tension of the liquid solder. Furthermore, the electrical coupling of the transmitting device can thus be realized in a simple way and thus the transmitting device can be provided particularly efficiently for assembly with the surface mount technology.

Advantageously, at least four electrical connection points may be formed on the housing base body, wherein two electrical connection points are each in the form of a plus pole of the transmitting device and two electrical connection points are each in the form of a minus pole of the transmitting device and/or wherein a first of the two plus poles and a first of the two minus poles are formed on a first edge of the housing base body and a second of the two plus poles and a second of the two minus poles are formed on a second edge of the housing base body opposite the first edge. Thus, in particular, redundant connection points can be provided, so that even in the event of a high mechanical stress on the transmitting device, in particular in the case of vibrations while a motor vehicle in which the transmitting device is installed is travelling, the functionality of the transmitting device is improved. Furthermore, in particular, the respective plus poles and the respective minus poles are directly opposite each other and are of a redundant form. This means that a first plus pole is formed on the first edge and the second plus pole is formed directly opposite on the opposite second edge. The same applies to the minus poles. Thus, in particular, a transmitting device can be provided for automated surface mounting in which the transmitting device can be disposed in two different installation positions. This can increase reliability during assembly. This has a background in the fact that both poles are arranged in the same way on both sides. This improves the functionality of the transmitting device.

According to a further advantageous embodiment, the light source unit may comprise a plurality of light elements and a respective light element of the plurality of light elements and/or a respective light source unit of a plurality of light source units of the transmitting device can be controlled separately by means of a control device of the transmitting device. In particular, a respective light source unit of the plurality of light source units can be assigned at least two respective electrical connection points, wherein a first of the two electrical connection points is formed as a plus pole and a second of the two electrical connection points is formed as a minus pole of the light source unit. In particular, four electrical connection points can then be provided per light source unit, wherein each of the light sources is electrically coupled to the plus pole of the light source unit and the minus pole of the light source unit. In particular, it can be realized that the emitted light is emitted essentially homogeneously, since the different areas, which may be illuminated differently due to overlaps, can be controlled differently. This makes it possible to operate the transmitting device even more precisely and reliably.

It has further proved advantageous if the housing is embodied in one piece with its housing base body and the housing attachment, in particular of plastic. By means of this form of embodiment, the housing can be produced very quickly and precisely, for example by means of an injection moulding process. In particular, this also reduces the number of components and makes further assembly of the pre-assembly module particularly simple and also automated.

According to an advantageous embodiment, the light source unit may comprise a plurality of light elements, which are in particular embodied as VCSEL (Vertical-Cavity Surface-Emitting Laser) laser diodes. Since in particular the VCSEL laser diodes can be operated with a low voltage, the control electronics, in particular the entire control device of the transmitting device, can be kept particularly small, since the individual components are smaller than with conventional edge emitter diodes, which can significantly reduce the installation space of the transmitting device. The low power of the VCSEL laser diode compared to conventional edge emitter diodes is compensated by the fact that instead of just one laser diode, a number of VCSEL laser diodes is used. In particular, the use of the VCSEL laser diodes prevents measurement artefacts or edge artefacts from arising. As a result, the transmitting device can be even more precise and reliable.

Another aspect of the invention relates to an optical sensing device with a transmitting device according to the invention. The optical sensing device can be a lidar sensor or a laser scanner. In addition, another aspect of the invention concerns a motor vehicle with an optical sensing device according to the invention. In particular, the motor vehicle may be embodied as a passenger car. Advantageous embodiments of the transmitting device according to the invention are to be regarded as advantageous embodiments of the optical sensing device according to the invention as well as of the motor vehicle according to the invention.

Further features of the invention result from the claims, the figures and the description of the figures. The features and the combinations of features mentioned above in the description as well as the features and/or the combinations of features mentioned in the description of the figures alone can be used not only in the respective combination but can also be used in other combinations or on their own without departing from the scope of the invention. Therefore, versions of the invention are also to be regarded as included and disclosed that are not explicitly shown and explained in the figures, but that arise from the separate feature combinations from the described embodiments and that are capable of being produced. Embodiments and combinations of features are also to be regarded as disclosed that do not comprise all the features of an originally formulated independent claim as a result. In addition, embodiments and combinations of features, in particular due to the embodiments set out above, are to be regarded as disclosed that go beyond or deviate from the combinations of features that are set out in the references to the claims.

BRIEF DESCRIPTION OF THE DRAWINGS

Exemplary embodiments are described below using schematic drawings.

In the figures.

In the figures, identical or functionally identical elements are provided with the same reference characters.

DESCRIPTION OF EMBODIMENTS

Figure 1:
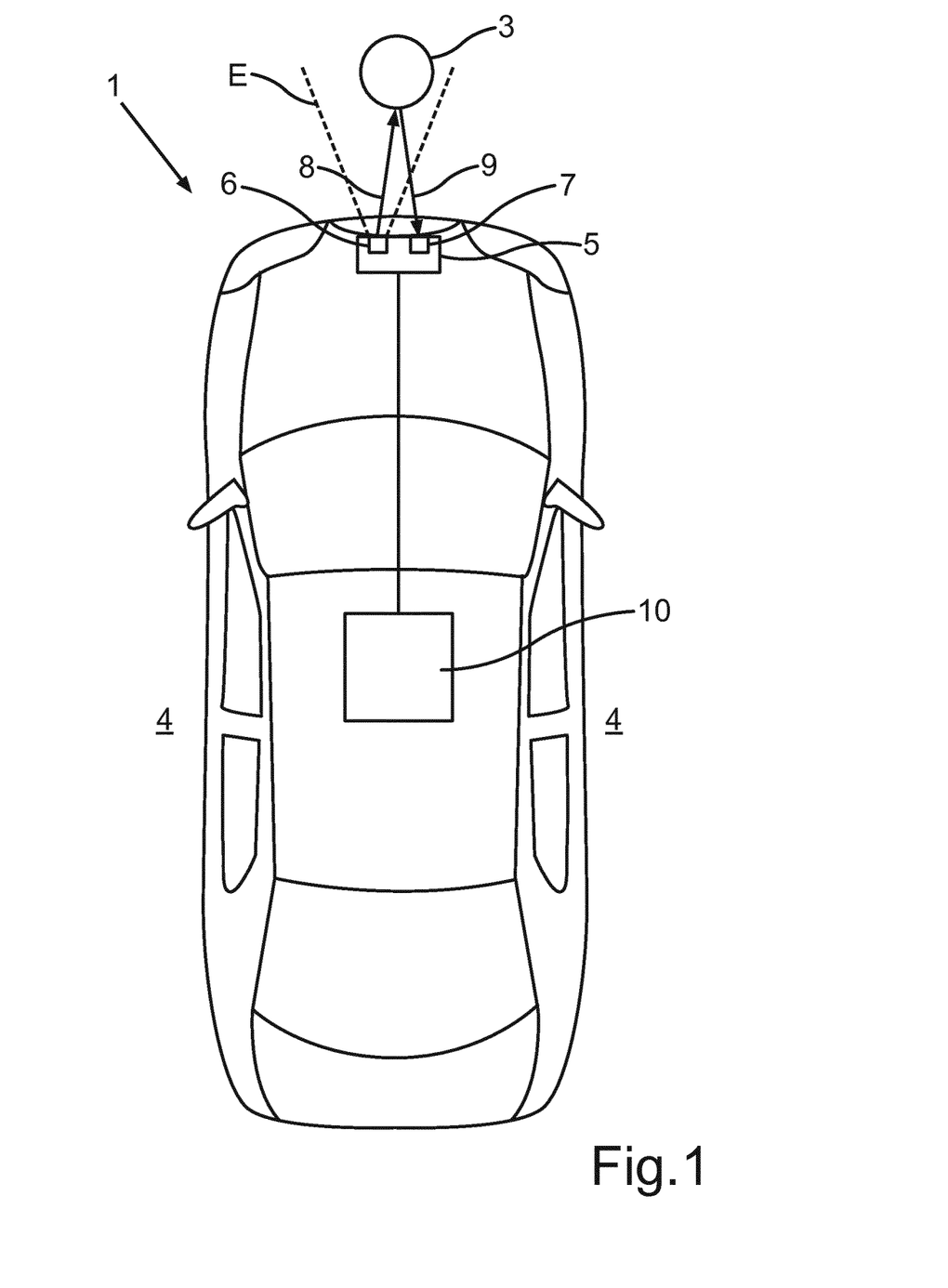
FIG. 1 shows a schematic plan view of an embodiment of a motor vehicle according to the invention with an embodiment of an optical sensing device according to the invention.

FIG. 1 shows a motor vehicle 1 according to an embodiment of the present invention. The motor vehicle 1 is designed in the present exemplary embodiment as a passenger car. The motor vehicle 1 comprises a driver assistance system 2. With the driver assistance system 2, for example, an object 3 that is located in an environment 4 of the motor vehicle 1 can be detected. In particular, a distance between the motor vehicle 1 and the object 3 can be determined by means of the driver assistance system 2.

The driver assistance system 2 comprises at least one optical detection device 5. The optical detection device 5 can be embodied as a lidar sensor or as a laser scanner. The optical sensing device 5 comprises a transmitting device 6, with which light rays 8 can be emitted. The transmitting device 6 comprises in particular a plurality of light elements 35 (FIG. 5) that are formed in particular as VCSEL (Vertical-Cavity Surface-Emitting Laser) laser diodes. The optical detection device 5 is disposed in the present case on a front region of the motor vehicle 1. The optical detection device 5 can also be disposed in other regions of the motor vehicle 1, for example in a rear region or in a side region. The present example is therefore not to be considered final but serves only as an illustration.

With the transmitting device 6, the light rays 8 can be emitted within a predetermined detection range E or a predetermined angular range. For example, the light rays 8 can be emitted in a predetermined horizontal angular range. In addition, the optical detection device 5 comprises a deflection device that is not shown, with which the light rays 8 can be deflected into the environment 4 and thus the detection range E is scanned.

In addition, the optical detection device 5 comprises a receiving device 7 that may be embodied as a photodiode, for example. With the receiving device 7, the light rays 8 reflected by the object 3 can be received as a receiving signal. Furthermore, the optical sensing device 5 may comprise a control device 6a that may be formed by a microcontroller or a digital signal processor, for example. The driver assistance system 2 also comprises a control device 10 that may be formed by an electronic control unit (ECU) of the motor vehicle 1, for example. The control device 10 is connected to the optical detection device 5 for data transmission. The data transmission can be carried out via a data bus of the motor vehicle 1, for example.

Figure 2:
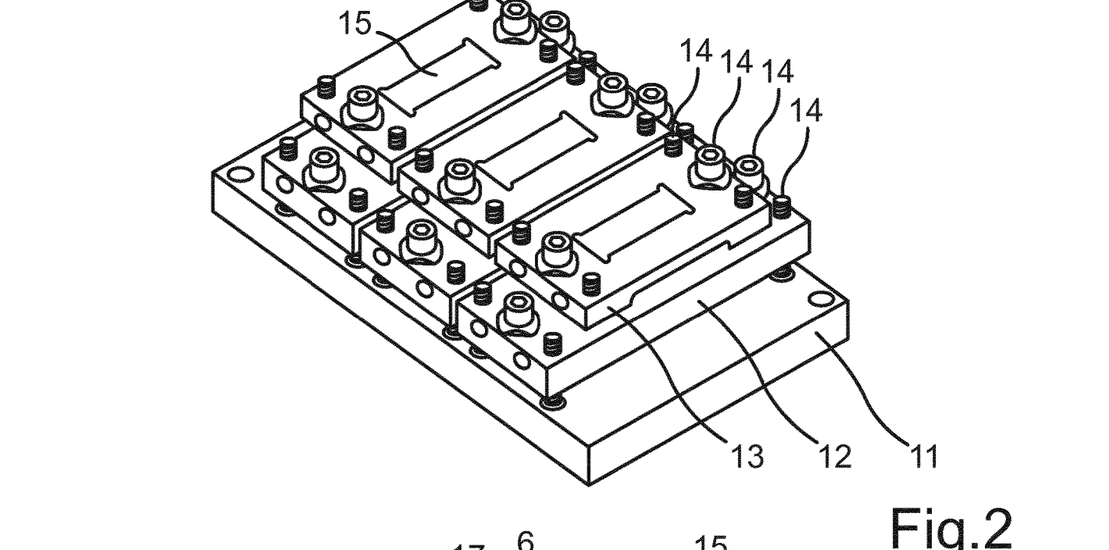
FIG. 2 shows a transmitting device in accordance with the state of the art.

FIG. 2 shows a transmitting device 6 according to the prior art. The transmitting device 6 comprises a copper plate 11, on which an edge emitter diode is disposed. The copper plate 11 is used in particular for cooling the edge emitter diode, which, in particular, is necessary during continuous operation of the edge emitter diode. A holder 12 for an external resonator can be mounted above the copper plate 11. A holder 13 for a lens arrangement can in turn be attached above the holder 12. The individual components can be screwed onto each other by means of screws 14. In particular, the holder 12 can then be screwed onto the copper plate 11 and the holder 13 can be screwed onto the holder 12. This arrangement is very heavy, for example due to the copper plate 11, and can only be assembled with a lot of effort. Due to the size, the transmitting device 6 from the prior art is not directly attached to a printed circuit board 36 (FIG. 3) of the transmitting device 6. Furthermore, the assembly is specific and is only possible as an individual assembly and is therefore very time-consuming.

Figure 3:
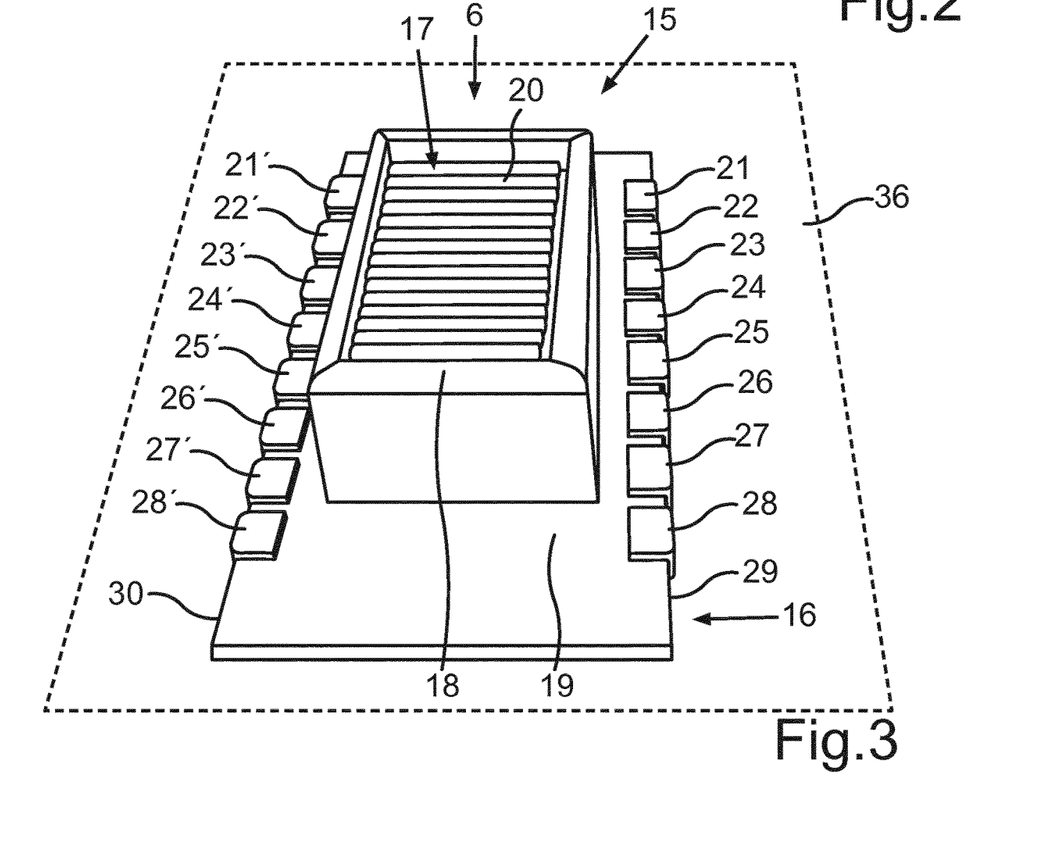
FIG. 3 shows a schematic perspective view of an embodiment of a transmitting device according to the invention.

FIG. 3 shows the transmitting device 6 according to an embodiment of the invention in a schematic perspective view. FIG. 3 shows a one-piece housing 15, in which a light source unit 32 (FIG. 4) and in particular an optical device 17 are arranged. The housing 15 is available as a pre-assembly module 16, in particular as an SMT module or as a surface mounted module. As a result, the pre-assembly module 16 can then be processed simply and automatically in an SMT process, in particular for the production of the optical detection device 5. In particular, as a result the transmitting device 6 can be disposed on the printed circuit board 36 of the transmitting device 6 in a surface mount process in accordance with the surface mount technology. In particular, the surface mount process can take place automatically, so that a time saving can be achieved compared to the individual assembly.

Figure 4:
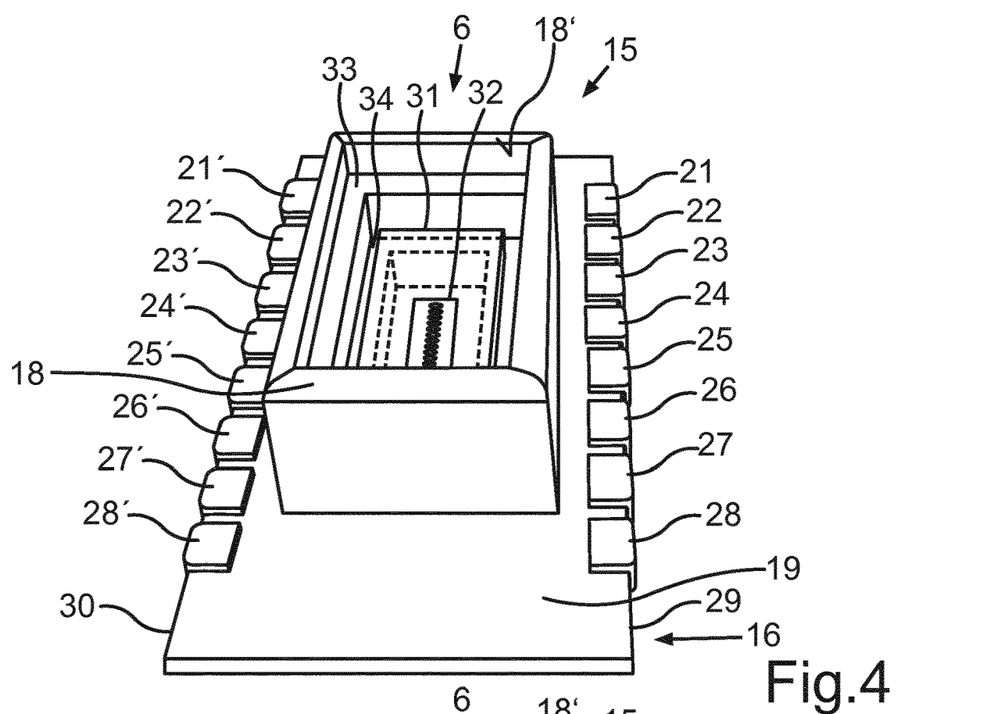
FIG. 4 shows a schematic perspective view of an embodiment of the transmitting device according to the invention.

FIG. 3 shows in particular a housing attachment 18 of the housing 15, which is in particular in a block-shaped form. Furthermore, FIG. 3 shows a housing base body 19 of the housing 15, which is in particular in a plate-shaped form. The optical device 17 and the light elements 35 that are not shown here (FIG. 5) can be arranged within the block-shaped housing attachment 18. The optical device 17 in turn comprises in particular the lens arrangement 20 and an external resonator 31 that is not shown (FIG. 4). In particular, the beam shape of the light emitted by the light elements 35 and/or the light source unit 32 can be influenced by means of the optical device 17. The emitted light, in turn, can then be transmitted into the surroundings 4 of the motor vehicle 1.

The housing base body 19 is in particular in an angular form and is embodied to protrude beyond the dimensions of the housing attachment 18 in both spatial directions in the plane thereof spanning the plate shape. The housing base body 19 comprises a plurality of electrical connection points 21 to 28 and 21' to 28'. The electrical connection points 21 to 28 and 21' to 28' are in particular formed at a first longer edge 29 of the housing base body 19 with respect to the rectangular shape and a second opposite edge 30 of the housing base body 19. In particular, the connection points 21 and 21' shown here form a plus pole of the transmitting device 6, and the connection points 22 and 22' form a minus pole of the transmitting device 6. The connection points 23 and 23' form a plus pole and the connection points 24 and 24' form a minus pole. The connection points 25 and 25' form a plus pole and the connection points 26 and 26' form a minus pole. The connection points 27 and 27 form a plus pole and the connection points 28 and 28' form a minus pole. The pole formations are in particular redundantly embodied at the two edges 29 and 30. The pole formation shown here is only exemplary and is not to be considered final. The pole formation can vary both in the number and in the arrangement of the connection points 21 to 28 and 21' to 28'. The number of connection points 21 to 28 and 21' to 28' or the poles may be particularly dependent on the number of light source units 32 within the transmitting device 6, or the number of light elements 35 within a respective light source unit 32.

In particular, the corresponding connection points 21 to 28 and 21' to 28' can be soldered to corresponding connection points on the printed circuit board 36, whereby the automated process of an assembly can be carried out in a simplified manner.

FIG. 3 also shows as an example the printed circuit board 36 of the transmitting device 6 on which the pre-assembly module 16 is mounted by SMT manufacturing technology.

FIG. 4 shows a further perspective view of an embodiment of the transmitting device 6 according to the invention. The lens arrangement 20 of the optical device 17 is not shown in FIG. 4. The external resonator 31 of the optical device 17 is shown in FIG. 4. The light of the light source unit 32 can be reflected within the arrangement by means of the external resonator 31. This allows the light intensity of the light coupled out by the transmitting device 6 to be increased. The light source unit 32 is disposed below the external resonator 31. In particular, the light source unit 32 is disposed on the housing base body 19.

FIG. 4 also shows that the hollow housing attachment 18 is in particular in a stepped form, in particular with at least two lands 33, 34, which are formed in particular as platforms and on an inner side 18' of the housing attachment 18. In particular, the external resonator 31 is disposed on the lower first land 34 and in particular the lens arrangement 20 is disposed on the higher second land 33, which is in particular higher than the first land 34.

Figure 5:
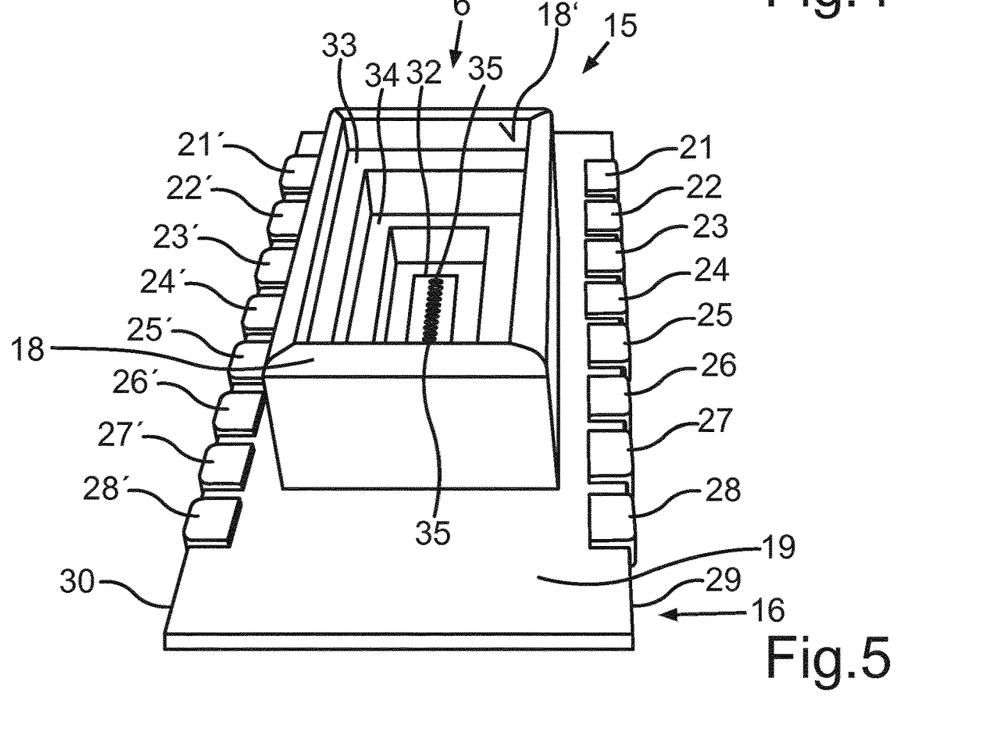
FIG. 5 shows a schematic perspective view of an embodiment of the transmitting device according to the invention.

FIG. 5 shows a further schematic perspective view of an embodiment of the transmitting device 6 according to the invention. The optical device 17 is not shown in FIG. 5. The lands 33 and 34, on the other hand, are shown in full. Furthermore, it can be seen in FIG. 5 that the light source unit 32 comprises a number of the light elements 35. The light elements 35 are in the form in particular of VCSEL laser diodes.

In particular, it is apparent from FIG. 5 that the housing 15 is formed in particular in one piece. In particular, the housing 15 may be formed from a plastic. This enables particularly simple and precise production of the housing 15. For example, the housing 15 can be manufactured by means of an injection moulding process. Other manufacturing processes are also possible.

Figure 6:
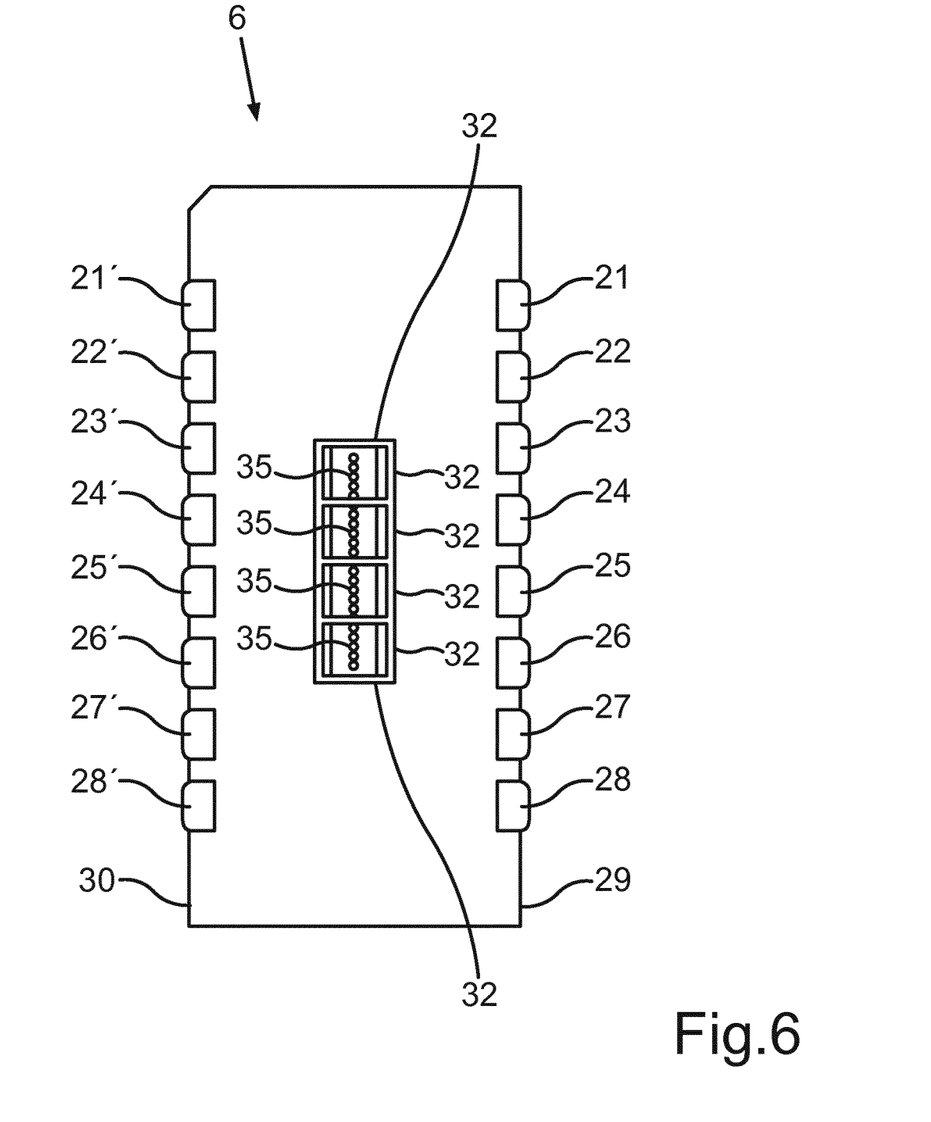
FIG. 6 shows a schematic plan view of an embodiment of the transmitting device according to the invention.

FIG. 6 shows a schematic top view of an embodiment of the transmitting device 6 according to the invention. The embodiment of the transmitting device 6 shown in FIG. 6 comprises four light source units 32. The light source units 32 in turn comprise a plurality of light elements 35, which are in particular in the form of VCSEL laser diodes. In particular, it may then be provided that the light source unit 32 or the light elements 35 can be individually controlled by means of the control device 6a of the optical detection device 5. As a result, homogeneous light radiation can be produced. For example, the plus pole for a first of the light source units 32 can be provided by the connection points 21 and 21' and a minus pole for the first of the light source units 32 can be provided by the connection points 22 and 22'. In turn, a plus pole for a second of the light source units 32 can be provided by the connection points 23 and 23' and a corresponding minus pole for the second light source unit 32 can be provided by the connection points 24 and 24'. A plus pole for a third light source unit 32 can be provided by the connection points 25 and 25' and the corresponding minus pole for the third light source unit 32 can be provided by the connection points 26 and 26'. A plus pole for a fourth light source unit 32 can be provided by the connection points 27 and 27' and in turn a corresponding minus pole for the fourth light source unit 32 can be provided by the connection points 28 and 28'. The number of light source units 32 is only exemplary and by no means final. The number of connection points 21 to 28 and 21' to 28' can then also vary according to the number of light source units 32.

As can be seen in FIG. 6, in particular the redundant connection points 21 and 21' are formed directly opposite on the edges 29 and 30. The same applies to the connection points 22 to 28 and 22' to 28'. As a result, connection points 21 to 28 and 21' to 28' of the individual light source unit 32 can be easily realized, in particular as a result the connection points 21 to 28 and 21' to 28' can be provided for pre-assembly for the surface mount process.

The invention claimed is:
1. A transmitting device for an optical sensing device of a motor vehicle, the transmitting device comprising:
   at least one light source unit;
   an optical device that influences the beam shape of light emitted by the at least one light source unit, wherein the light is transmitted to the surroundings of the motor vehicle by the transmitting device; and a housing in which the light source unit and the optical device are arranged and as a result a pre-assembly module is formed for mounting on a printed circuit board of the transmitting device.

2. The transmitting device according to claim 1, wherein the pre-assembly module is embodied as a surface mounted module.

3. The transmitting device according to claim 1, wherein the housing comprises a plate-shaped housing base body and a housing attachment, wherein the housing is attached to the printed circuit board by the housing base body and the optical device and the light source unit are arranged in the housing attachment.

4. The transmitting device according to claim 3, wherein the housing attachment is formed in a stepped form on an inner side of the housing attachment and comprises at least a first land and a second land.

5. The transmitting device according to claim 3, wherein the housing base body is of an angular form and protrudes beyond the dimensions of the housing attachment in both spatial directions in the plane thereof spanning the plate shape.

6. The transmitting device according to claim 3, wherein at least two electrical connection points are formed on the housing base body, one of which is a plus pole of the transmitting device and one is a minus pole of the transmitting device, and the electrical connection points are formed on a first edge of the housing base body.

7. The transmitting device according to claim 3, wherein at least four electrical connection points are formed on the housing base body, wherein two electrical connection points are each formed as a plus pole of the transmitting device and two electric connection points are each formed as a minus pole of the transmitting device and a first of the two plus poles and a first of the two minus poles are formed at a first edge of the housing base body and a second of the two plus poles and a second of the two minus poles are formed at a second edge of the housing base body opposite the first edge.

8. The transmitting device according to claim 4, wherein the optical device comprises an external resonator.

9. The transmitting device according to claim 8, wherein the optical device comprises a lens arrangement.

10. The transmitting device according to claim 9, wherein the external resonator of the optical device is disposed on the lower first land, and the lens arrangement of the optical device is disposed on the higher second land.

11. The transmitting device according to claim 1, wherein the light source unit comprises a plurality of light elements and a respective light element of the plurality of light elements and/or a respective light source unit of a plurality of light source units of the transmitting device can be controlled separately by means of a control device of the transmitting device.

12. The transmitting device according to claim 1, wherein the housing is embodied in one piece of plastic.

13. The transmitting device according to claim 1, wherein the light source unit comprises a plurality of light elements which are in the form of VCSEL laser diodes.

14. An optical sensing device comprising: a transmitting device according to claim 1; and a receiving device.

15. A motor vehicle with an optical sensing device according to claim 14.

* * * * *